United States Patent [19]
Hanton

[11] 3,761,209
[45] Sept. 25, 1973

[54] MANUFACTURE OF RIGID PHENOL-ALDEHYDE FOAMS

[75] Inventor: Daniel Hanton, La Neuville Roy, France

[73] Assignee: Compagnie de Saint-Gobain, Neuilly sur Seine, France

[22] Filed: Mar. 28, 1972

[21] Appl. No.: 238,814

Related U.S. Application Data
[62] Division of Ser. No. 879,040, Nov. 24, 1969.

[30] Foreign Application Priority Data
Nov. 29, 1968 France .............................. 68175976

[52] U.S. Cl............ 425/4 C, 425/174.8 R, 425/371
[51] Int. Cl............................................. B29d 27/04
[58] Field of Search ..................... 425/4, 4 C, 817, 425/817 C, 174 HD, 371

[56] References Cited
UNITED STATES PATENTS

| | | | |
|---|---|---|---|
| 3,475,522 | 10/1969 | Garibian et al. | 425/4 C |
| 2,929,793 | 3/1960 | Hirsh | 425/817 C |
| 2,945,261 | 7/1960 | Aykanian et al. | 425/817 C |
| 3,215,581 | 11/1965 | Carlson et al. | 425/817 C |
| 2,975,470 | 3/1961 | Snelson et al. | 425/371 |
| 3,550,212 | 11/1970 | Gray | 425/4 C |
| 3,270,102 | 8/1966 | Aiken | 425/174 HD |

*Primary Examiner*—H. A. Kilby, Jr.
*Attorney*—John T. Synnestvedt

[57] ABSTRACT

Phenol-aldehyde foams are made by forming first and second mixtures of the reactants of which one contains the phenolic component and the other the formaldehyde component, one or the other containing the catalyst and blowing agent. Adjuvants such as silicone oil may be added to one or the other of the mixtures. When the first and second parts are mixed, they are applied evenly to a conveyor having a nonadherent surface at a temperature favorable to reaction and foam formation. The sheet is shaped to its dimensions between upper and lower conveyors and the surfaces hardened to permit handling without distortion. Drying is by dielectric loss. Total time of manufacture is reduced by the order of 12-15 hours and a better, more uniform, and purer product substantially free of acid and moisture is produced. Novel apparatus is also described.

7 Claims, 5 Drawing Figures

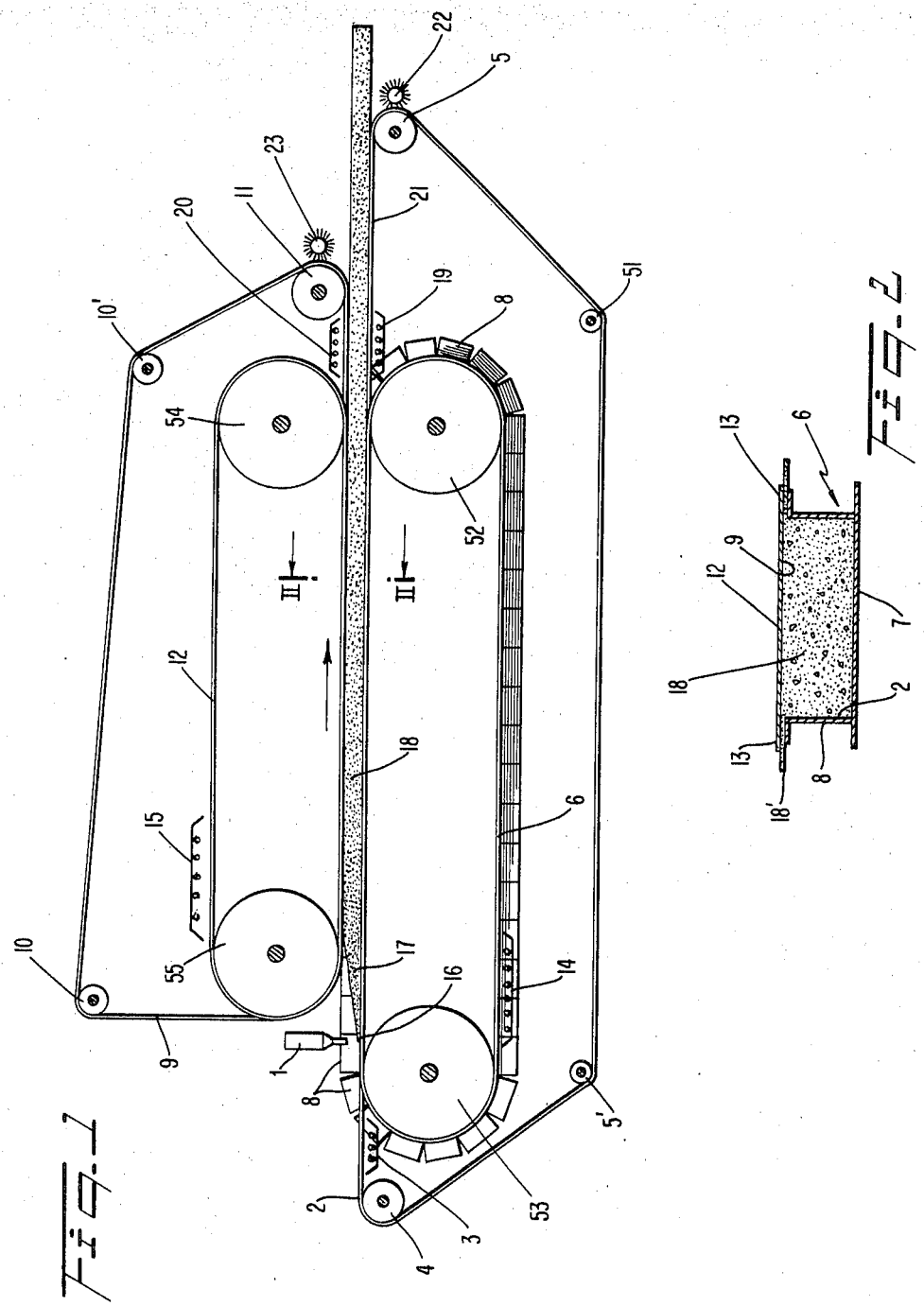

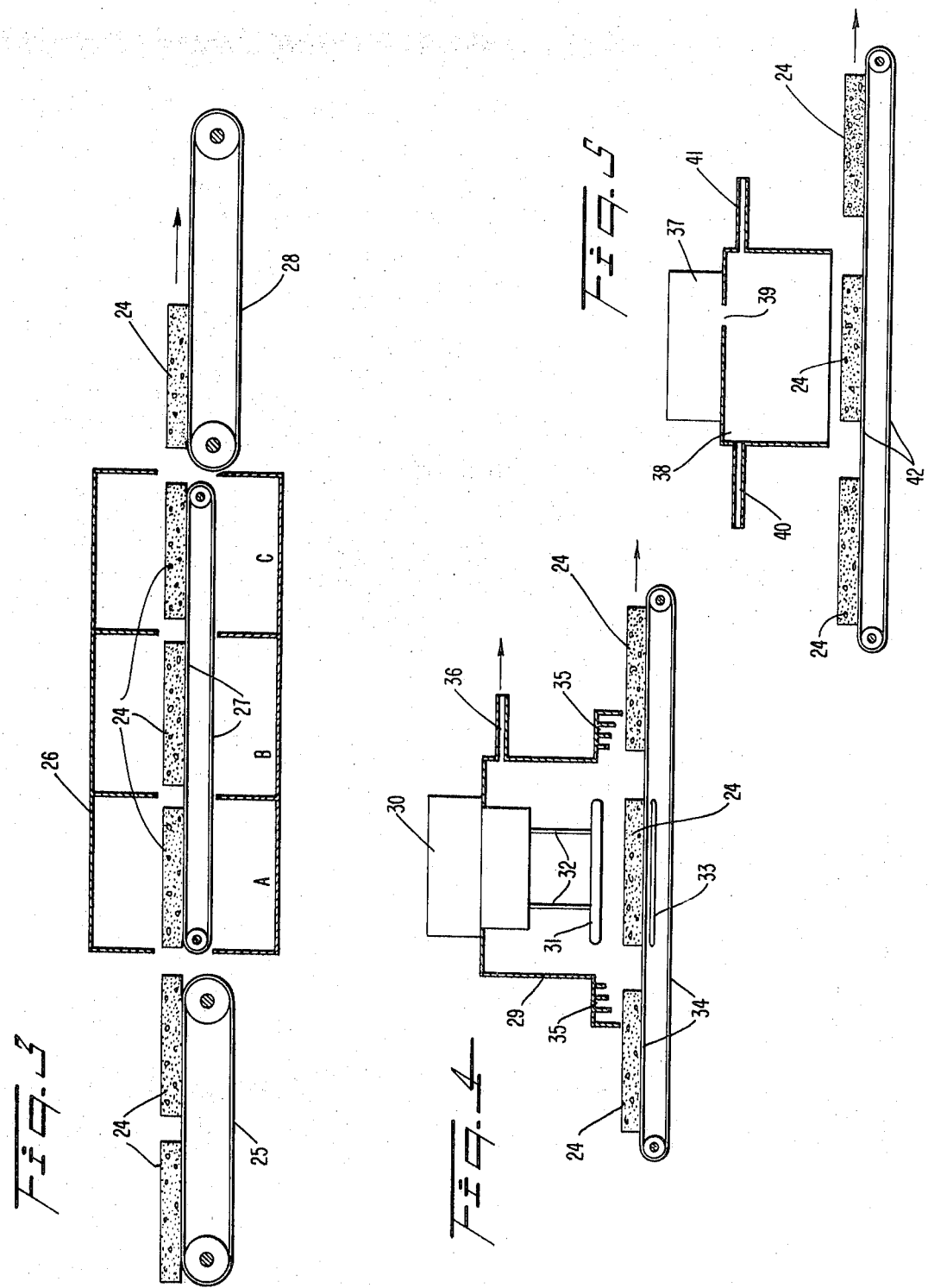

MANUFACTURE OF RIGID PHENOL-ALDEHYDE FOAMS

This is a division of application Ser. No. 879,040, filed Nov. 24, 1969.

This invention relates to the manufacture of sheets, plates, blocks, and the like of thermohardening resin foam, and to the methods and apparatus for making such expanded products from pasty or fluid mixtures of the ingredients, for use as paneling in the building industry, as heat and sound insulation, and as buffers. These industries are turning more and more frequently to synthetic resinous materials to replace the unsatisfactory materials known to the prior art, the insufficiencies of which are manifold and well known.

Among the synthetic materials theoretically available are many sorts of synthetic resins, and among these the phenol formaldehydes, and phenol aldehyde resins in general, which are thermohardening and offer theoretical possibility of satisfactory use, but which are in fact difficult to make in satisfactory quality. The resin and the foam are good insulation, heat travels slowly through them, they contain water and acid which must be removed, that in the center of the foam passing through layers of cell walls before it can reach the surface and escape. The heat to remove it must penetrate from the surface. Normal drying time in an oven, for a piece 50 × 50 × 5 cm., until constant weight is attained has been 12 to 15 hours, necessitating large expenses in heat, equipment, and handling charges, and resulting in imperfect drying.

It is an object of this invention to make phenol aldehyde foam in sheet and plate form, to do it rapidly, to eliminate handling, to dry it thoroughly throughout its thickness, to deacidify it, to make it more homogeneous, so that the cells in the product will be of uniform size uniformly distributed, and to make its manufacture, from paste to finished plate, continuous.

The objects of the invention are accomplished, generally speaking by a method of making phenol-formaldehyde foam in sheet form which comprises forming the reactants in parts of which one contains the phenolic component of the resin and the second contains the formaldehyde component, the parts also containing blowing agent, a surface active agent comprising silicone oil, and a promoter of the reaction, mixing the parts and immediately applying the mixture evenly to a conveyor having a non-adherent surface comprising a polyfluoroethylene at a temperature favorable to reaction and foam formation, shaping the expanded foam to its dimensions as a sheet between upper and lower conveyors, hardening the surfaces thereof by applying heat thereto, severing the sheet into panels, drying the panels by dielectric loss in a high frequency field, and further drying the surfaces of the panels; and by an apparatus for the continuous manufacture of phenol-aldehyde sheet foam and the like comprising upper and lower conveyor means and means to drive them, said conveyor means having surfaces non-adherent to the foam, means to apply the foam-forming mixture to the lower conveyor means, means to heat the conveyor means in advance of the means to apply, means to heat the surface of the foam after shaping between the conveyor means to form a resistant layer, and means to dry the foam by a high frequency field.

The resinous materials preferred for this process are the heat hardening resins of phenolic type. The phenolic resins are a recognized class which is defined in the chemical dictionaries. See The Condensed Chemical Dictionary, Reinhold, Sixth Edition, page 877. The most widely used phenolic resins are the phenol-aldehydes and of these the phenol formaldehydes which are representative of preferred practice in this invention and will be used for illustration. The ingredients normally used to make this class of resin are phenol, formaldehyde, an acid catalyst, and a blowing agent. Except as stated hereinafter the quantities of the ingredients employed, the temperatures, and the conditions of reaction are as in the prior art and only the novel conditions essential to this invention will be stated herein.

The slow process of the prior art has made handling difficult and distortion probable because of the soft condition of the foam during the larger part of its formation. It is, therefore, another object to rigidify the foam sufficiently to make its handling possible and to prevent its distortion. This object has been accomplished by subjecting both faces of the incipient sheet during its passage between the supporting and forming conveyors to a thermal treatment at a temperature sufficiently elevated to form a resistant pellicle on each face. It has been established that this thermal treatment of the surface establishes surface layers which are relatively hard and relatively dense compared to the central portion of the resinous mass undergoing expansion.

A particularly important object of the invention is to reduce the time required for its manufacture, to produce the product continuously, and to shape it in the first instance to its desired form so that nothing is required to obtain sheets of different selective sizes than to cut them from the advancing end of the product. Within the scope of this object of the invention is novel apparatus and machinery adapted to the manufacture of this superior product and of such efficiency that the time required for manufacture is reduced to a small fraction of that which was previously necessary.

The apparatus according to the invention includes a pair of belt conveyors disposed to establish the thickness of the sheet, vertical walls which are preferably a part of one of the belts, which establish the width of the sheet, and an apparatus for uniformly distributing the materials undergoing expansion on the lower belt. Thus, the phenolic resin in a fluid state containing a catalyst, a swelling agent, and other necessary or desirable adjuvants is flowed onto the lower conveyor belt evenly, allowed to expand freely for a time related to the speed of the belt, and is then contained between the lower belt and the upper belt which establish a sheet having the desired right section. The sheet thus formed is then subjected to the novel method of drying, hardening, and eliminating volatile substances.

In the novel apparatus which is part of the invention the resin in liquid or pasty state is applied regularly to the surface of the lower conveyor by means of a nozzle which moves back and forth across the conveyor belt. In order to achieve maximum thermal effectiveness, the surface of the belt which receives the deposit is heated to a uniform temperature which is high enough to stimulate the formation of the resin and its expansion.

According to another characteristic of the invention the lower belt of the conveyor may have the form of a channel, the sides of which are pivoted to the belt in order to form continuous walls which establish the width of the sheet and permit pivoting at the ends of the run. Such construction is known for other uses. The flow of the resin is regulated as a function of the speed of the conveyors, the density of final product which is desired, and the thickness. The incipient resin is applied by the reciprocating nozzle at a rate which, when expanded, entirely fills the space between belts and the side walls of the channel.

According to a preferred form of the invention each conveyor belt is composed of two belts, one within the other, of which the inner serves to receive and support the outer and the outer has a surface to which the resin as applied and the foam as hardened do not adhere. Such belts may conveniently be made of a web of glass fibers impregnated or covered with polytetrafluoroethylene, which is non-adherent and unaffected by the temperatures and reactants involved, or of other polyfluoroethylenes. Thus, the inner belt which furnishes the support may be made of metal slats pivoted to chains and the outer belt composed as just stated, forming a strong structure capable of asserting compressive effect when desired. This structure permits continuous operation, the formation of smooth surfaces on the foamed sheets, and ready discharge from the belts. The separation of the product from the belts can be further facilitated, as a subsidiary concept of this invention, by heating the belt in the zone of discharge by means of infrared light. After discharge the receiving belts can be brushed to remove any adherent particles prior to receiving another charge.

The belts are preferably preheated just before they receive the charge to a temperature which facilitates the reaction of the resin-forming ingredients, the operation of the blowing agent, and the formation of a durable outer pellicle on the opposite faces of the sheet which is denser, more rigid, and harder than the interior thereof. These steps are important to the invention but they leave the foam, particularly the phenolic resins, containing a substantial quantity of water and an aqueous acid. The water being derived from the aqueous solutions in which the phenol formaldehyde resin is prepared, from the aqueous acid solution employed as a catalyst, and from the reaction which occurs during the hardening of the resin. It is necessary to remove the water and the acid from the foam in order to impart maximum properties of insulation and strength and to prevent the product from being internally degraded and from corroding the objects with which it comes in contact. It is a particularly valuable feature of the invention that the drying of the foam after it has been expanded and the hardened pellicles have been formed at its surface is carried out by dielectric losses generated within the foam by a high frequency field, the frequency of which is preferably on the order of 1,000 to 3,000 MHz. Drying these hardened, expanded foams by dielectric losses generated in a high frequency electromagnetic field accomplishes the distribution of heat at the very beginning, in the very center of the material, produces a high yield from the transformation of the electromagnetic energy into heat and reduces the drying time to an extent almost incredible. This invention reduces the time of drying of phenolic resins in many cases to about one-hundredth of that which was necessary with the prior art methods of drying by convection and conduction.

After the drying by dielectric loss there may be a small residue of moisture in the hardened surface pellicles and this can be removed by circulation of hot air or by infrared heating.

The mixtures of components for the phenolic resins will be as in the prior art for each class, standard compositions of phenol formaldehyde being employed for such foams and standard formulas of phenol-acetaldehyde and phenol-furfural being mixed according to good practice with such promoters as good practice has dictated in the past. It is, however, important if the cells in the foam are to be reasonably uniform in size and uniformly distrubuted throughout the sheet to include a surface active agent in the composition, silicone oil being particularly valuable in this use. The method of using silicone oil in such compositions is related in French Patent No. 1,462,288. The blowing agent is of ordinary type, for instance fluorotrichloro methane and trifluorotrichloroethylene. It is thus apparent that the fluoro-substituted hydrocarbons are useful whether they contain an ethylene bond or not. If increased fire resistance is desired, the resin may include an organic nitrogenous product which, when heated, releases a non-combustible gas. Thus the mixture may contain the incipient phenolic resin, a blowing agent, a promoter, a nitrogenous organic compound, and silicone oil. All the ingredients can be mixed together at once or they can be divided into two compositions A and B, each of which is inert until mixed with the other, the two being mixed just before distribution on the moving belt of the novel apparatus. Thus, to obtain products which are particularly fire resistant a nitrogenous mineral compound or a nitrogenous organic compound can be mixed with the catalyst acid, a mixture of phenolic resin and blowing agent can be made up separately, and the two can be mixed just before application to the conveyor. The lower belt may be bent as a channel, in which case the sides may be fixed and not part of the conveyor.

According to another feature of the invention the mixture of incipient resin, blowing agent, and catalyst can receive some resorcinol to reduce the quantity of acid necessary to produce the exothermic reaction, which boosts the rate and completeness of the foaming.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a vertical longitudinal section through a diagrammatic apparatus illustrating the first steps of the process and certain construction of the apparatus;

FIG. 2 is a transverse section on the line II—II of FIG. 1;

FIG. 3 is a vertical longitudinal section through apparatus illustrating the treatment of plates of foam after separation from the continuous sheet;

FIG. 4 is a longitudinal section through a diagrammatic illustration of a high frequency dryer; and FIG. 5 is a vertical longitudinal section, diagrammatic in character, illustrating the application of a magnetron and wave-guide drier.

Referring now to the numerals of the drawing, the mixture of raw materials, including the components of the phenolic resin, adjuvants, blowing agent, and catalyst, as described hereinabove, is introduced at a creamy consistency into the nozzle 1 which is preferably equipped with a mixer to assure homogeneity. This mixer nozzle reciprocates across a conveyor 2 upon which it forms a layer of uniform thickness. This conveyor may be composed of glass fiber fabric covered by polytetrafluoroethylene which furnishes a perfectly smooth support for the cream deposited by the nozzle. This conveyor is preferably preheated to 30°–40° C. by infrared tubes 3 of which the current supplied may be regulated. It passes around the rollers 4, 5, 5' and is supported by another conveyor 6 which comprises metal slats 7, strongly constructed and substantially unbendable in this use, which sustain the pressures involved. Side pieces 8 are fixed to these slats forming with part 7 a channel in which the foam is at liberty to expand until it engages the upper conveyor 9. The upper conveyor is similar in construction to the lower conveyor except that the side pieces 8 are unnecessary. An inner conveyor 12 similar in construction to 6 supports and operates in combination with the outer conveyor 9 which is constructed as is conveyor 6. The foam 18 fills the space within the upper and lower conveyors and the sides 8 without substantial compression if desired or, if compression is desired, the quantity of the foam is greater than that which, at full expansion, would fill that space. In some cases as shown in FIG. 2 the foam may project between the upper conveyor 9 and the flanges of sides 8 as shown at 18', these projections being removed later by trimming. The inner conveyor passes around rollers 52, 53 and 54, 55 while the upper outer conveyors passes around rollers 55, 10, 10', 11 and the lower outer conveyor passes around rollers 4, 5, 5', respectively.

The conveyors 6 and 12 are heated respectively by heating units 14, 15 delivering infrared light. A temperature of 40° C. is usually adequate.

The expansible cream is deposited at 16 on the full width of the conveyor 2, expanded at 17 before coming in contact with the conveyor 9. During this expansion, which occurs in free air, the expanded resin occupies the whole volume of the channel formed by conveyor 6 and sides 8. As it completes its expansion, the foam engages the upper conveyor 6 and fills the space between the sides 8. After a short time the product begins to harden and passes between the infrared heaters 19, 20, of adjustable power which add additional firmness to the material constituting the faces of the sheet. The heaters 19, 20 also assist, by raising the temperature of the surfaces of the sheet, in freeing the sheet from the conveyors. The surfaces of the sheet 21 are now sufficiently hard and pass between the conveyors 2 and 9 to the rollers 11 and 5 where the separation is effected. Brushes 22 and 23 clean the surfaces of the conveyors of any traces of resin which might adhere to them and return, clean, to the head end of the machine. The sheet 21 progresses toward further treatment and may be cut into panels before undergoing such treatment.

FIG. 3 shows such panels 24 being forwarded by a conveyor 25 toward a tunnel furnace 26 having compartments A, B, C at different temperatures. The conveyors in FIG. 3 may be run continuously or step by step so that each panel will receive a stated treatment at the different temperatures in compartments A, B, C. It is preferable to dry continuously stepwise because in each step homogeneous drying is achieved whereas with continuous flow drying there is danger of deforming the product. Therefore, in the preferred form of the invention the formation of the sheet is continuous and the drying is stepwise, continuity of the whole operation being assured by proper regulation so that the rate of drying equals the rate of production. The manner of heating is not indicated in FIG. 3 but in FIGS. 4 and 5. After drying the panels are received on a conveyor 28 and taken off for storage or use.

As shown in FIG. 4 the panel 24 travels on a conveyor 34 (equivalent to 27 in FIG. 3) into a chamber 29 where it is subjected to a high frequency field produced by a generator 30 connected to an electrode of emission of the high frequency field 31. Arms 32 which support the electrode are vertically movable to change the distance of the electrode from the panel. A terminal electrode 33, plane and grounded, is opposite electrode 31 and on the other side of the conveyor 34. Ray traps 35 prevent the escape of the field and conduit 36 removes the volatile elements, under vacuum if need be.

With relation to FIGS. 4 and 5 it is unnecessary to cut the sheet into panels as drying is satisfactorily accomplished on the continuous sheet.

In the apparatus of FIG. 5 a hyperfrequency field is produced by a magnetron 37 placed above the chamber of treatment 38. A wave guide 39 controls the field generated by the magnetron. The chamber 38 is scavenged of volatile materials released by the panel 24 by an air inlet 40 and conduit of discharge 41 through which a current of air flows at a rate sufficient to capture all such volatiles.

It is shown in FIG. 3 that any number of such chambers can be employed so that the drying of the sheet may be accomplished at the rate of manufacture. If the sheet is treated continuously without being cut into panels, the chamber 38 need not be closed and wave traps can be disposed at the point of admission and the point of departure as in the high frequency apparatus of FIG. 4.

The following examples illustrate the preferred form of the invention:

EXAMPLE 1

A composition A containing the phenolic component of the resin, a surface active agent, and the blowing agent was supplied at 1,080 g./m. to the mixing nozzle 1. At the same time the component B, which contained hydrochloric acid as a promoter and dicyanformol, was put into the mixer 1 at 190 g./m. Thus the total flow of the cream onto the conveyor was 1,270 g./m. The conveyor belt 2 was preheated to 35° C. and the belts 6 and 12 were preheated so as to produce a temperature of 40° C. in the zone of expansion of the foam. The creaming time, that is to say the time between the laying of the cream on the conveyor and the beginning of its expansion, was 20 seconds and the time required for complete expansion was on the order of 3 minutes. The speed of the screen was set at 60 cm./min. The length of the zone of compression was 3 m. After 6 minutes the foam arrived in the heating zone 20 of screens 2 and 9 which were at 105° C. The density before drying was 65 kg./m.$^3$. The product was cut in 1 m. lengths then transferred at the same speed to a drying tunnel having three compartments 1 m. long although a single compartment 3 m. long can be used. The drying was such as to produce 25–28 percent loss of weight in 3 minutes and the density of the dried product was 50 kg./m.$^3$.

The following examples show the improvement which is achieved by the use of high frequency drying compared to drying with hot air using the identical apparatus under identical conditions except for the substitution of high frequency dryers of the type of FIG. 4 or FIG. 5 for the hot air drying of the prior art.

EXAMPLE 2

It took 12–15 hours to dry a panel of foam as above described, of size 50 × 50 × 5 cm., to constant weight in a circulating air oven at 100° C. It took 8 minutes to obtain the same result utilizing a high frequency field of 915 mc./sec. at a power of 16 kw.

EXAMPLE 3

A panel of foam as above described (phenol formaldehyde) 25 × 25 × 5 cm. was dried to constant weight in 12–15 hours in a circulating air oven at 100° C. It took 5–6 minutes to achieve the same result when a panel of the same size and same material was submitted to the action of a field of hyperfrequency of 2,450 mc./sec. with an electrical power of 750 w.

Of these two examples it is to be noted that the hyperfrequency drying is more economical than the high frequency drying but that both are infinitely superior to the practices of drying by heat applied to the surfaces.

In the foregoing examples the following compositions were made:

Composition A: 100 parts by weight of a phenol-formaldehyde resin having the molar ratio of formaldehyde to phenol of two to one, as a 72 percent dry extract, was mixed with 1.5 parts by weight silicone oil, and 5 parts by weight monofluorotrichloromethane.

Composition B: 5 parts by weight of a dicyandiamideformaldehyde resin having the molar ratio of formaldehyde to dicyandiamide of 1.4 to 1, as a 67 percent dry extract, was mixed with 15 parts by weight of hydrochloric acid of 1.19 density.

These new materials have many uses, examples of which are as insulation in building construction; insulation for roofs, particularly for flat roofs; interlayer insulation in plywood and the like; base for the formation of sheets coated with metal foil, plastic, or the like; insulation for refrigerators and cold chambers.

As many apparently widely different embodiments of the present invention may be made without departing from the spirit and scope thereof, it is to be understood that the invention is not limited to the specific embodiments.

What is claimed is:

1. Apparatus for the continuous manufacture of phenol-aldehyde sheet foam and the like comprising continuous moving endless upper and lower conveyor means for establishing the thickness and width of the sheet foam and for forming hardened pellicles on the opposite surfaces of the sheetfoam, said lower conveyor means comprising a lower metallic conveyor having a receiving end and a discharge end and an upwardly facing horizontally moving plane surface and vertically extending moving side walls for determining the width of the sheet foam, a separate belt supported by and moving with the lower conveyor, said upper conveyor means comprising a conveyor of shorter length than said lower conveyor and having a downwardly facing horizontally moving surface above and facing the lower conveyor adjacent the discharge end of the lower conveyor, and a belt engaging and moving with the downwardly facing surface of the upper conveyor, said belts having surfaces nonadherent to the foam, means to apply the foam forming mixture to the receiving end of the lower conveyor, means to heat the receiving end of the lower conveyor in advance of the means to apply, infrared means to heat the surface of the foam after shaping and while between the conveyor means to form a hardened resistant layer on the opposite surfaces of the sheet foam without drying the sheet foam, and means to receive the undried sheet foam from the discharge end of the lower conveyor including means to sever the sheet into panels and to dry the panels by feeding them through a high frequency field.

2. Apparatus according to claim 1 in which the lower conveyor comprises a series of channel shaped elements.

3. Apparatus according to claim 1 in which the means to dry the panels comprises an electrode supplied by a high frequency generator and target electrode arranged on opposite sides of the path of the moving panels.

4. Apparatus according to claim 1 in which the means to dry the panels comprises in cooperative relation a magnetron, wave control means, and a chamber through which the panels pass.

5. Apparatus according to claim 1 in which the means to dry the panels comprises conveyor means, an enclosure covering the conveyor means, and a high frequency wave generating means acting within the enclosure upon the panels carried by the conveyor means.

6. Apparatus according to claim 5 in which the generating means includes electrode means disposed on opposite sides of conveyor means supporting the panels.

7. Apparatus according to claim 5 in which the enclosure includes a wave trap associated with the electrode means.

* * * * *